(No Model.)

A. T. FOSTER.
CORN PLANTER.

No. 371,051. Patented Oct. 4, 1887.

Attest:
Jno. G. Hinkel Jr.
A. E. Hansmann.

Aaron T. Foster,
Inventor.
By Foster & Freeman
Attys.

UNITED STATES PATENT OFFICE.

AARON T. FOSTER, OF CHILLICOTHE, OHIO.

CORN-PLANTER.

SPECIFICATION forming part of Letters Patent No. 371,051, dated October 4, 1887.

Application filed August 24, 1887. Serial No. 247,759. (No model.)

*To all whom it may concern:*

Be it known that I, AARON T. FOSTER, a citizen of the United States, and a resident of Chillicothe, Ross county, Ohio, have invented certain new and useful Improvements in Corn-Planters, &c., of which the following is a specification.

My invention is an improvement in corn and other similar planters, and relates particularly to that class wherein the planting operation is positively effected through the medium of some moving part of the machine, the object being to provide a planter which may be produced at a comparatively small cost, is simple in its construction and operation, and in which the parts are so disposed that they may be readily repaired or replaced when occasion requires.

To this end the invention consists in the peculiar construction and organization of the parts of the planter, hereinafter fully set forth, and illustrated in the accompanying drawings, in which—

Figure 1:
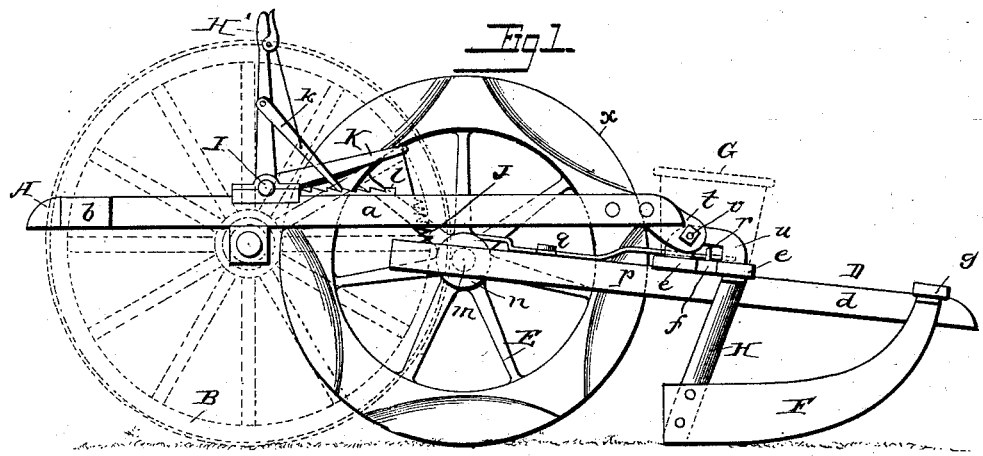
Figure 2:
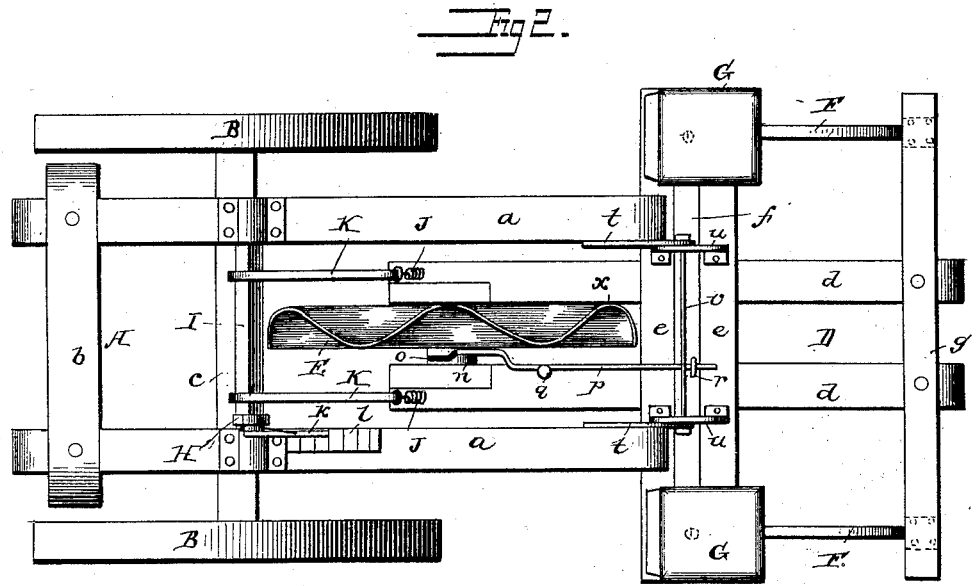

Figure 1 is a side elevation of a planter embodying my invention, and Fig. 2 is a plan view thereof.

The planter consists, essentially, of a main frame, A, of suitable construction, mounted upon supporting and covering wheels B in the usual manner, and a runner-frame, D, likewise of any required form, pivotally connected about midway of its length to the forward part of the main or wheel frame, and carrying at the rear end a traction-wheel, E, and at its forward end the furrow-openers or runners F F and their related parts, so that the runner-frame may be readily adjusted upon its pivots by means under the control of the driver to throw the traction-wheel and runners into or out of operative engagement with the ground, as will presently appear.

As shown and preferred, the wheel-frame A consists of two parallel side beams or bars, *a a*, connected at their rear ends by a cross-piece, *b*, securely bolted thereto, and these side bars rest upon and are firmly attached to an axle, *c*, journaled in the supporting wheels B B.

The runner-frame D is composed of two parallel bars, *d d*, connected about midway of their length by two cross-pieces, *e e*, which are slightly separated to receive and guide between them the ordinary seed-slide *f*, while mounted upon the extreme ends of the cross-pieces *e e* are the seed-hoppers G G, the feed-openings of which are in line with the wheels B B, as usual. The bars *d d* are placed sufficiently close together to pass freely in between the corresponding bars, *a a*, of the wheel-frame, and are also connected at their forward ends by a cross-bar, *g*, which projects beyond the bars *d d* the required distance to constitute supports for the forward ends of the runners F F, the rear ends of the latter being riveted or otherwise securely attached to the lower ends of hollow standards H H, arranged in line with the openings leading from the seed-hoppers in the ordinary manner.

The forward ends of the bars *a a* of the wheel-frame are provided with metal brackets *t t*, which are firmly riveted or otherwise attached to the inner sides of the bars, while properly secured to the cross-pieces *e e* of the runner-frame are brackets *u u*, preferably of an inverted-U shape, and a bolt, *v*, passing through suitable openings in the brackets *t* and *u*, pivotally connects the frames together.

The traction-wheel E is mounted on a shaft, *m*, journaled in bearings in the rear end of the bars *d d* of the runner-frame, and carries at one side a collar, *n*, provided with a cam-groove, *o*, in which works the inner end of a lever, *p*, pivoted at *q* to one of the bars *d*, while its opposite end passes loosely through a staple or keeper, *r*, on the seed-slide *f*. It will thus be seen that as the traction-wheel revolves by contact with the ground a reciprocating motion is imparted to the seed-slide, thereby permitting the seed to pass from the hoppers through suitable openings in the slide, as such openings register with the feed-openings in the hoppers, all as is well understood.

To readily swing the runner-frame upon its pivots to bring the traction-wheel and runners into or remove them from contact with the ground, I employ the usual hand-lever, H', carried by a shaft, I, journaled in bearings arranged on the upper side of the wheel-frame, and connect the inner end of the runner-frame, preferably by spiral springs J, to arms K, secured to the shaft I, a pawl, *k*, pivoted to the hand-lever and engaging a suitable rack-bar, *l*, serving to retain the parts in their adjusted position.

A rigid connection between the runner-frame and arms K may of course be substituted for the springs J, if so desired; but the springs, while sufficiently rigid to permit the ready adjustment of the runner-frame without an undue movement of the hand-lever, at the same time allow the frame to swing slightly upon its pivots, so that the traction-wheel will always follow the contour of the ground.

To prevent the slipping of the traction-wheel and insure uniform operation of the machine under all ordinary conditions, I provide the periphery of the wheel with a corrugated or fluted bearing-surface, $x$, (best shown in Fig. 2,) preferably tapering or wedge shaped, so that when the rear end of the runner-frame is depressed the comparatively sharp edge of the wheel will readily penetrate the surface of the ground a sufficient distance to obtain a firm hold, and thus secure a positive movement of the wheel and the parts driven thereby as the machine advances.

It will be observed that as the runner-frame is pivoted to the wheel-frame about midway of its length and carries the traction-wheel at one side of the pivot-point and the runners and their related parts at the other side thereof, only a slight movement of the hand-lever is required to stop or start the machine, and as the traction-wheel is placed in the center of the machine and the seed-slide operated directly therefrom, as described, I avoid a multiplicity of joints and connecting-bars and levers, and render the machine very compact, simple, and practically free from all lost motion.

Without limiting myself to the precise construction and arrangement of parts shown, I claim—

1. In a corn or other similar planter, the combination, with the wheel-frame, of a runner-frame pivotally connected to the wheel-frame and carrying a traction-wheel at one side of the pivot-point and runners at the other side thereof, substantially as described.

2. In a corn or other similar planter, the combination, with the wheel-frame, of a runner-frame pivotally connected to the forward part of the wheel-frame, and carrying a traction-wheel in rear of the pivot-point and runners in front thereof, and means, substantially as described, for adjusting the runner-frame upon its pivots, as set forth.

3. In a corn or other similar planter, the combination, with the wheel-frame, of a runner-frame pivoted about midway of its length to the wheel-frame, a traction-wheel carried by the runner-frame at its inner end and runners and seed-slide carried thereby at its opposite end, and connections, substantially as described, between the traction-wheel and slide, as set forth.

4. In a corn or other similar planter, the combination, with the wheel-frame, of a runner-frame pivoted to the wheel-frame and carrying a traction-wheel at one side of the pivot-point and runners at the other side thereof, a hand-lever, and elastic connections between the hand-lever and runner-frame, substantially as described.

5. In a corn or other similar planter, the combination, with the wheel-frame, of a runner-frame pivoted about midway of its length to the wheel-frame and carrying a traction-wheel at one end and runners and seed-slide at the other end, connections, substantially as described, between the traction-wheel and slide, a hand-lever, and springs connecting the hand-lever and rear of the runner-frame, as set forth.

6. In a corn or other similar planter, the combination, with the wheel-frame, of a runner-frame pivotally connected thereto, a traction-wheel arranged in the center of the machine and journaled in the runner-frame in rear of said pivotal connection, a cam operated by the traction-wheel, seed-slide and runners carried by the runner-frame forward of its pivotal connection with the wheel-frame, a pivoted lever connecting the cam and slide, and means for adjusting the draft-frame, substantially as described.

7. In a corn or other similar planter, the combination, with the wheel-frame, of a runner-frame pivoted about midway of its length to the forward part of the wheel-frame, a traction-wheel having a corrugated or fluted tread journaled in the runner-frame in rear of said pivots, and a seed-slide and runners in front thereof, and connections between the traction-wheel and slide, substantially as and for the purpose set forth.

In testimony whereof I have signed my name to this specification in the presence of two subscribing witnesses.

AARON T. FOSTER.

Witnesses:
 BENJ. F. STONE,
 C. M. ROBERTS.